United States Patent [19]

Kish

[11] 4,227,732
[45] Oct. 14, 1980

[54] PNEUMATICALLY OPERATED GATE FOR HOPPER BOTTOMS FOR BULK HANDLING EQUIPMENT

[76] Inventor: Gerald J. Kish, 10711 Strasburg Rd., Erie, Mich. 48133

[21] Appl. No.: 963,222

[22] Filed: Nov. 24, 1978

[51] Int. Cl.³ .............................................. B60P 1/56
[52] U.S. Cl. ........................................ 294/71; 49/395; 105/251; 222/504; 222/506; 292/33; 292/144; 298/35 R; 298/38
[58] Field of Search ............. 298/29, 30, 31, 32, 298/33, 34, 35 R, 35 M, 38; 414/414; 105/247, 248, 250, 251, 252; 49/394, 395; 292/33, 144; 222/485, 486, 504, 505, 506; 294/71

[56] References Cited

U.S. PATENT DOCUMENTS

| | | | |
|---|---|---|---|
| 866,204 | 9/1907 | Kopf | 105/252 |
| 891,963 | 6/1908 | Stafford | 298/35 R |
| 1,536,353 | 5/1925 | Parkes | 298/35 R |
| 1,569,997 | 1/1926 | Möller | 298/34 |
| 3,581,672 | 6/1971 | Aquino | 105/248 X |
| 3,692,353 | 9/1972 | Lynde | 292/144 X |

FOREIGN PATENT DOCUMENTS 240558 11/1911 Fed. Rep. of Germany ........... 105/252

*Primary Examiner*—L. J. Paperner
*Attorney, Agent, or Firm*—Wilson, Fraser, Barker & Clemens

[57] ABSTRACT

A hopper gate mechanism for opening and closing the bottom opening of a hopper containing vehicle. The mechanism typically includes two doors hinged along the longitudinal axis of the associated vehicle and fluid pressure actuated motor means for selectively actuating latching members normally employed to maintain the doors in a closed position.

7 Claims, 6 Drawing Figures

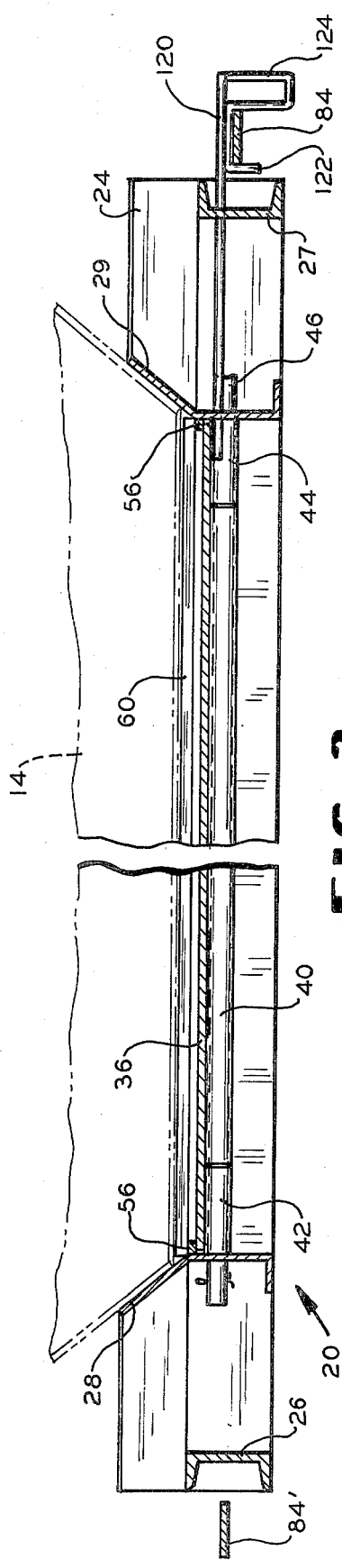
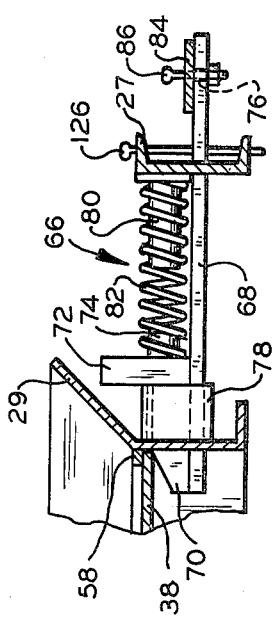
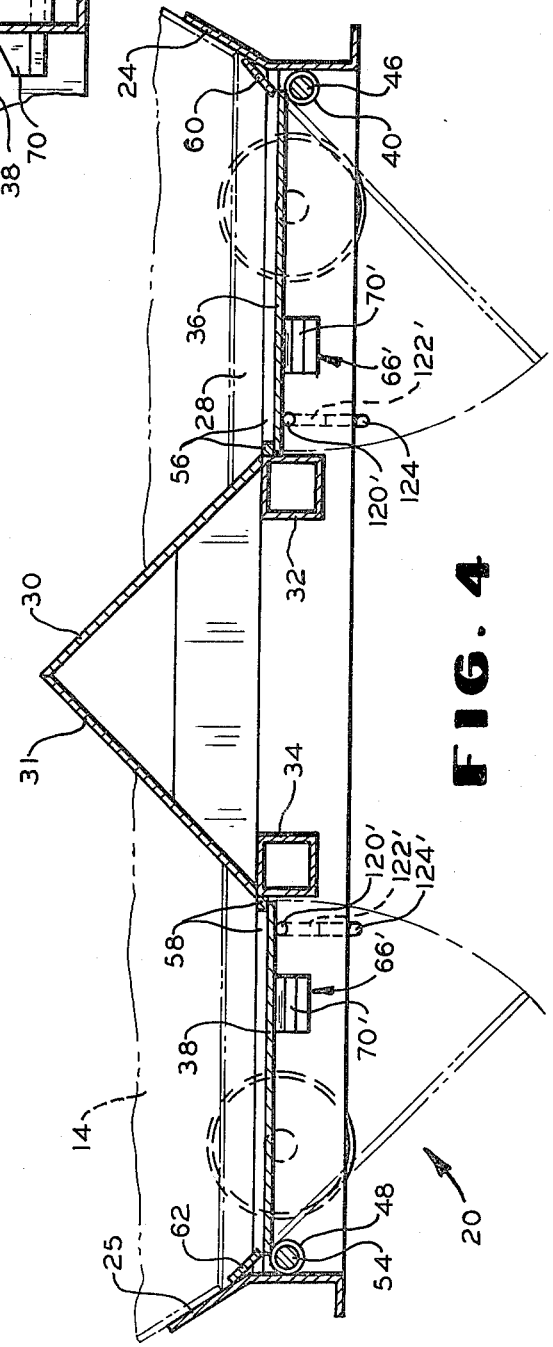

PNEUMATICALLY OPERATED GATE FOR HOPPER BOTTOMS FOR BULK HANDLING EQUIPMENT

BACKGROUND OF THE INVENTION

1. Field of the Invention

The invention relates to mechanisms for operating the normally latched closed doors of a hopper containing vehicle from a location remote that of the doors.

2. Description of the Prior Art

In the conventional hopper containing vehicles employed to haul granular bulk material, the normally closed doors at the bottom exit of the hoppers are typically opened by a rack and pinion mechanism, for example. Such mechanism is manually operated at a location in the immediate vicinity of doors. It has been found that two primary problems exist with the known type mechanism. Initially, the rack and pinion mechanism becomes readily fouled by the air-borne particles of the bulk material as it is being unloaded causing subsequent operation of the mechanism to become difficult and sometimes impossible. Secondarily, since the operator must inherently be positioned close to the existing bulk material, the health hazard of breathing the air-borne particulates is ever present.

SUMMARY OF THE INVENTION

It is an object of the present invention to produce a gate mechanism for a hopper bottom employing reciprocating latch members to effect the opening of the closure doors.

It is another object of the invention to produce a gate mechanism for hopper bottoms which can be operated at a location remote from the hopper bottom.

Another object of the invention is to produce a gate mechanism for hopper bottoms which may be readily and economically manufactured and installed on existing hopper assemblies.

Still another object of the invention is to produce a gate mechanism for hopper bottoms wherein the associated latching mechanism may be positively latched in an open or closed position.

A further object of the invention is to produce a gate mechanism including at least two door closures for hopper bottoms including latching means operable to selectively open the door closures.

The above, as well as other objects of the invention may be achieved by a hopper gate mechanism comprising a frame defining a hopper opening; a pair of door closures to open and close the opening in the frame; hinge means pivotally mounting one edge of each of the door closures to the frame; at least two spaced apart latch members having inner latching ends and outer ends, the latch members movable between a first position wherein the inner ends are in latching with each of the door closures and a second position wherein the inner ends are out of latching engagement with each of the door closures; a draw bar pivotally interconnecting the outer ends of the latch members, and motor means coupled to the draw bar for effecting selective pivotal movement of the draw bar to selectively move the latch members into the second position out of engagement with the door closures.

BRIEF DESCRIPTION OF THE DRAWINGS

The objects and attendant advantages of the invention will become clearly apparent to one skilled in the art from reading the following detailed description of a preferred embodiment of the invention when considered in the light of the accompanying drawings, in which:

FIG. 3 is a sectional view of the mechanism illustrated in FIG. 2 taken along line 3—3 thereof;

FIG. 4 is a sectional view of the mechanism illustrated in FIG. 2 taken along line 4—4 thereof;

FIG. 5 is a fragmentary sectional view of one of the latching members illustrated in FIG. 2 taken along line 5—5 thereof.

DETAILED DESCRIPTION OF THE PREFERRED EMBODIMENT

Figure 1:
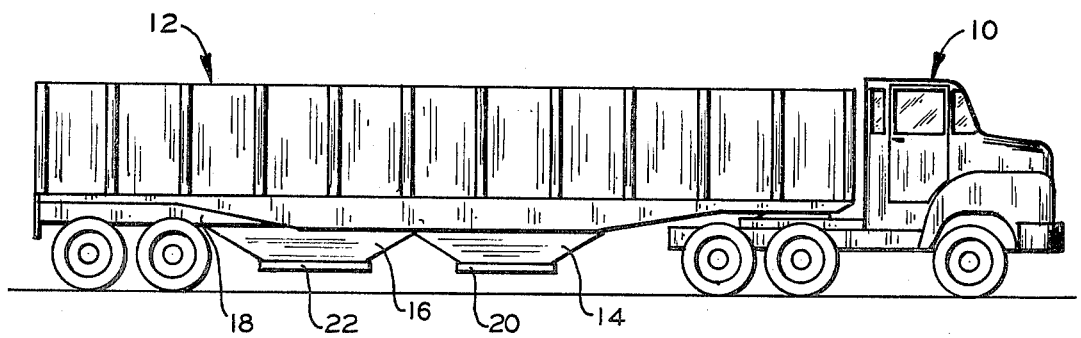
FIG. 1 is a side elevational view of a vehicle trailer for hauling bulk material equipped with hopper gate mechanism of the invention.

Referring to FIG. 1 of the drawings, there is illustrated a vehicle arrangement including a tractor 10 and an associated trailer 12 of the type having hopper assemblies 14 and 16 adapted to depend from the bottom of the main frame member 18. The bottom of the hopper assemblies 14 and 16 are provided with hopper bottom closure means, generally indicated by reference numerals 20 and 22, respectively. Since the closure means 20 and 22 are typically identical with one another, only a single one will be explained in detail hereinafter.

Figure 2:
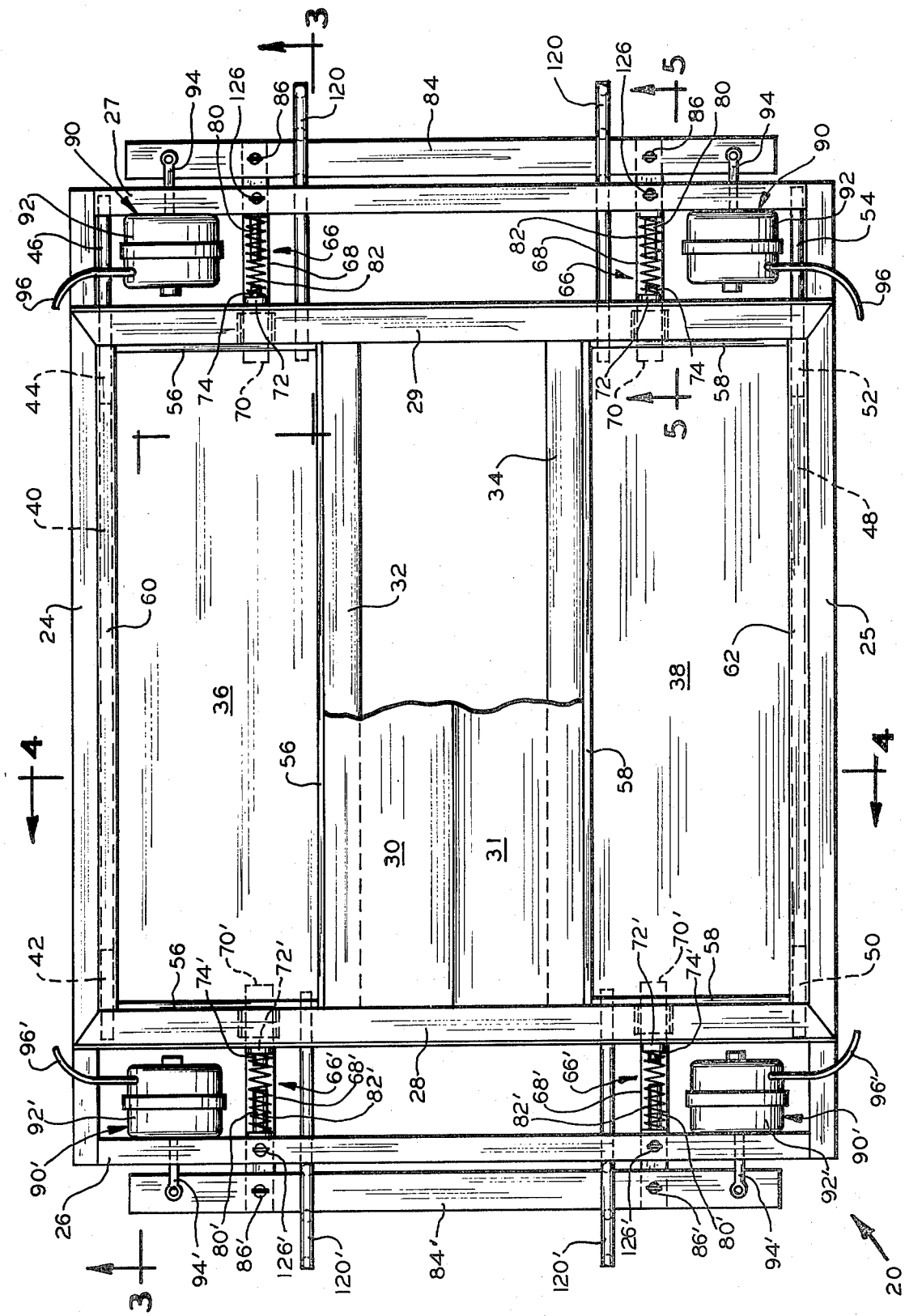
FIG. 2 is an enlarged plan view of the hopper gate mechanism utilized in the vehicle illustrated in FIG. 1.

FIGS. 2, 3, and 4 clearly show the closure means 20 secured to the bottom opened end of the hopper 14. The closure means 20 includes a generally rectangular frame formed of a pair of spaced apart parallel members 24 and 25 adapted, in assembled form on a vehicle, to extend longitudinally of the vehicle. Beam members 26 and 27 are positioned to form opposite ends of the main frame and are welded or otherwise suitably secured to respective ends of the longitudinally extending members 24 and 25. Two additional cross members 28 and 29 are positioned in spaced apart relation parallel to, and spaced inwardly of, the beam members 26 and 27. The opposite ends of the cross members 28 and 29 are welded or othewise suitably secured to the longitudinally extending members 24 and 25. The longitudinal members 24 and 25, and the cross member 28 and 29 are welded or otherwise suitably secured to the longitudinally extending members 24 and 25. The longitudinal members 24 and 25, and the cross members 28 and 29 are formed of material having the same cross-sectional configuration and are dimensioned to conform in size to the outside dimensions of the bottom of the hopper 14. The cross-sectional configuration of the members 24, 25, 28 and 29, as is clearly apparent in FIGS. 3, 4, and 5, includes a generally vertically extending main body web-like portion having an upwardly and outwardly extending upper portion and a transversely outwardly extending lower portion.

Due to the geometry of the hopper bottom 14 and the proximity thereof to the ground level, the use of two closure doors to completely span the resultant opening formed by members 24, 25, 28 and 29 have been found to be unsatisfactory because the necessary dimension of the doors would be so great as to cause the opening edges of the doors to contact the ground before being completely open. In other words to achieve a complete closure, the width of each door would be greater than the distance from the bottom of the hopper to the ground level. In order to overcome this problem of geometry, an inverted V-shaped section, comprised of metal panels 30 and 31, is positioned to extend axially of the vehicle within the central portion of the central opening of the frame members 24, 25, 28, and 29.

The contacting upper edges of the panels 30 and 31 are typically welded along their line of contact, while lower edges are welded or otherwise suitably secured to respective longitudinally extending tubes 32 and 34 which extend between and are secured to the cross members 28 and 29.

Door closures 36 and 38 are disposed at opposite sides of the inverted V-shaped section and are hinged at their outboard edge portions. A hollow pipe 40 is welded or otherwise suitably secured to the undersurface of the door closure 36 along the outer marginal edge thereof. The pipe 40 is designed to terminate inwardly of the opposite side edges of the door closure 36. Relatively short hollow pipe sections 42 and 44 are aligned with suitable apertures formed in opposing main body portions of the frame members 28 and 29 and the hollow pipe 40, and are respectively welded or otherwise suitably secured to the inner surfaces of the adjacent frame members 28 and 29. A hinge rod 46 is inserted through the aperture formed in the frame member 28, the aligned pipe sections 42, 40, 44, and thence through an aligned aperture in the cross member 27. The rod 46 is maintained in position by placing cotter pins or the like in the opposing terminal end portions thereof. With the above described hinge structure, it will be appreciated that the door closure 36 may swing from horizontal closed position to a substantially depending vertical position about the axis of the hinge rod 46.

The opposite closure door 38 is pivotally mounted with respect to the supporting frame in the same manner in which the closure door 36 is mounted. More specifically, a hollow pipe 48 is welded or otherwise suitably secured to the undersurface of the door closure 38 along the outer marginal edge thereof. The pipe 48 is designed to terminate inwardly of the opposite side edges of the door closure 38. Relatively short hollow pipe sections 50 and 52 are aligned with suitable apertures formed in opposing main body portions of the frame members 50 and 52 are aligned with suitable apertures formed in opposing main body portions of the frame members 28 and 29 and the hollow pipe 48, and are respectively welded or otherwise suitably secured to the inner surfaces of adjacent frame members 28 and 29. A hinge rod 54 is inserted through the aperture formed in the frame member 28, the aligned pipe sections 50, 48, 52, and thence through an aligned aperture in the cross member 27. The rod 54 is maintained in position by inserting cotter pins or the like in the opposing terminal end portions thereof. The door closure 38 is then capable of swinging about the axis of the hinge rod 54.

The door closures 36 and 38 are sealed with respect to the cooperating frame members 28 and 29 and the tubes 32 and 34 by means of sealing bars 56 and 58, respectively. While in the preferred embodiment, the bars 56 and 58 are welded to the frame members 28, 29 and the tubes 32 and 34, it will be appreciated that satisfactory results could be achieved by securing the base to the peripheral edges of the upper surface of the closure doors 36 and 38.

Deflector bars 60 and 62 are disposed above the hinge mechanisms for the closure doors 36 and 38, respectively. Typically, the bars 60 and 62 extend substantially the entire distance between the cross members 28 and 29 and have the upper edge portions thereof secured, as by welding, to the upper outwardly flared portions of the frame members 24 and 25. The bars 60 and 62 function to deflect the bulk material being carried in the associated hopper assemblies from entering the hinge mechanisms and adversely affecting the operation thereof.

The closure doors 36 and 38 are each maintained in a closed position by a pair of cooperating reciprocable latching plungers. Since the latching mechanism for each side of each door closure is identical, prime reference numerals will be used to illustrate corresponding elements of the latching mechanism for each closure door. Latching plungers 66, 66' are employed to cooperate with the undersurface of the closure door 36 to maintain the same in a closed position. As clearly illustrated in FIG. 5, it will be seen that the plunger 66 includes an elongate main body portion 68, the inner end of which terminates in an upwardly inclined cam surface 70. A shoulder 72 is formed integral with the main body portion 68 adjacent the cam surface 70 and, as will be appreciated hereinafter, limits the inward movement of the plunger 66 relative to the associated frame member 29. A spring retaining peg 74 projects outwardly away from the outer wall of the shoulder 72. The outer end of the main body portion 68 of the plunger 66 is provided with an aperture 76 for receiving fastening means for attaching the plunger to actuating mechanism.

In the assembled form, the cam surface 70 of the inner end of the plunger 66 is adapted to be received by and reciprocate within a hollow collar 78 which is aligned with a suitable aperture in the frame member 29 and welded or otherwise suitably secured to the outer surface of the frame member 29. The opposite end of the main body portion 68 of the plunger 66 is adapted to be received and reciprocate within a slotted aperture formed in the beam member 27.

A spring retaining member 80 has one end secured to the inner surface of the beam member 27 above the slotted aperture for the main body portion 68 of the plunger 66, while the opposite end extends inwardly.

One end of a helical spring element 82 is placed on the spring retainer peg 74 and the opposite end is placed on the spring retainer 80. Since the one end of the spring 82 abuts against the fixed beam member 27 and the other end abuts against the shoulder 72, the plunger 66 is constantly urged toward the latching position as illustrated in FIG. 5.

The outermost end of the main body portion 68 of the plunger 66 is pivotally coupled to a draw bar 84 by means of a fastener 86 which projects through the aperture 76 of the plunger 66.

A pneumatic motor 90 is fixed to the beam member 27 and includes a main cylinder or housing 92 containing a flexible diaphram (not shown) connected to a piston rod 94. The outer end of the piston rod 94 is pivotally connected to the draw bar 84. Pressure fluid is introduced into the motor 90 through a conduit 96.

Figure 6:
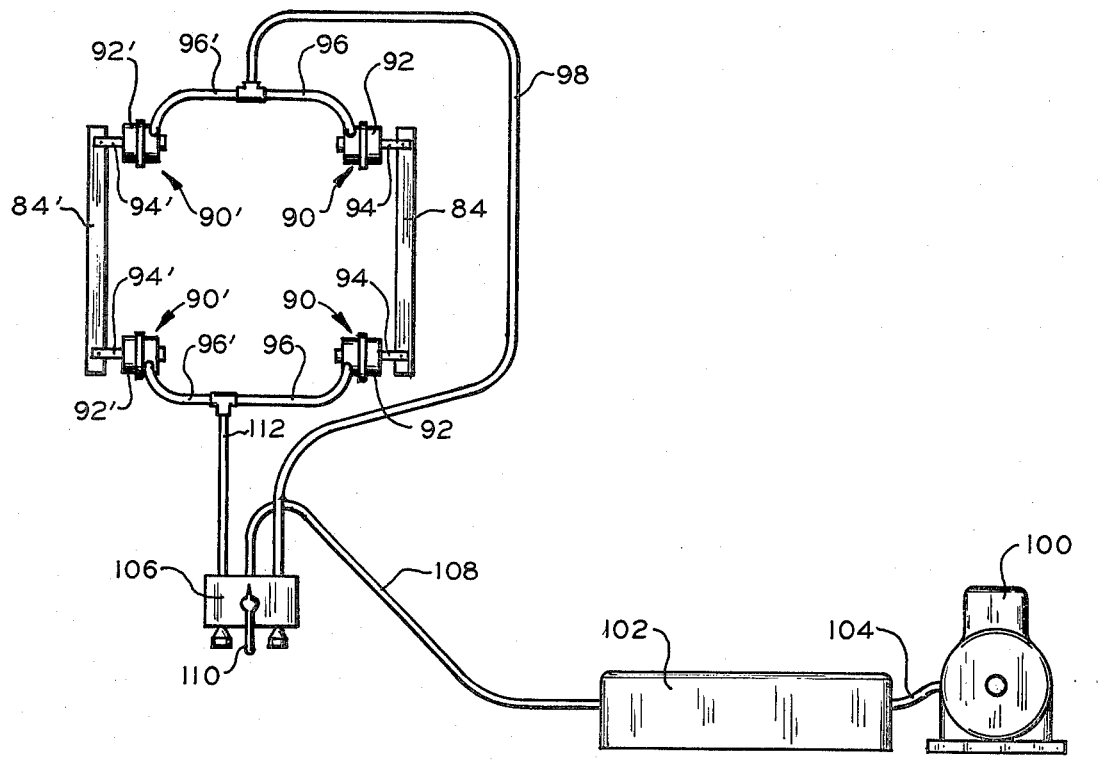
FIG. 6 is a schematic of the fluid pressure actuating system for operating the latching members of the invention.

As previously mentioned, the opposite side of the door closure 36 is provided with the identical mechanism wherein prime reference numerals are employed to represent elements corresponding to those described above. The mechanism to effect the unlatching of the closure door 36 are activated simultaneously by admitting pressure fluid through a conduit 98, illustrated in FIG. 6.

The source of pressure fluid for the actuation may be derived from a compressor 100 situated on the tractor 10 of the arrangement illustrated in FIG. 1. The compressor 100 is typically coupled to an accumulator 102 through a conduit 104. The accumulator 102 is coupled to a valving arrangement 106 through a conduit 108. The valving arrangement 106 is provided with a valve handle 110 which may be manually moved to cause pressure fluid to be selectively directed to the conduit 98 to activate the latching mechanism of the closure door 36; or alternatively to a conduit 112 to supply pressure fluid to activate the latching mechanism for the closure door 38.

In operation of the system thus far described, it will be assumed that it is the desire to cause the door closure 36 to open to begin discharging the load of bulk material which would be contained in the hopper bottom 14 and the associated bulk containing zone of the trailer 12. Initially, the operator turns the valve handle 110 of the valve arrangement 106 to admit pressure fluid to the conduit 98 which in turn directs pressure fluid to the conduits 96, 96' and thence to their respective pressure fluid actuated motors 90, 90'. As pressure fluid is admitted to the fluid pressure motors 90, 90', which causes the flexible diaphrams within the motor housings 92, 92', to move in a direction causing the piston rods 94, 94', to move outwardly, thus forcing the draw bars 84, 84' to move outwardly, generally about the pivotal connection between the other end of the draw bars 84, 84' and the piston rod 94, 94' of the unactivated fluid motors 90, and 90'. As the end of the draw bar 84 is moved outwardly away from the fixed frame, the plunger element 66 of the latching mechanism is caused to be likewise moved outwardly allowing the opposite edges of the door closure 36 to slide downwardly against the camming surfaces 70, 70' of the latching members as they are being withdrawn. As soon as the ends of the reciprocating latching plungers 66 are completely withdrawn to a point where the piston rods 94, 94' have completed their operational stroke, or the spring retainer members 74, 74' and 80, 80' contact one another, the door closure 36 is allowed to swing downwardly and outwardly about the axis of the hinge rod 46. Thereby, the bulk material within the associated trailer 12 may begin to be discharged.

Subsequently, the operator turns the valve handle 110 of the valving arrangement 106 to a position to admit pressure fluid through the line 112, and thence to the fluid motors 90, 90' which operate the latching mechanism for the door closure 38. The sequence of operational steps is identical with respect to the operation of the closure door 36. It must be understood that at the time the valve handle 110 is moved to a position to admit pressure fluid to the conduit 112, the conduit 98 is simultaneously valved to atmosphere allowing the pressure fluid within the motors 90, 90' which operated the closure mechanism for the closure door 36 to escape to the atmosphere. At this point in the operation, the helical spring elements 80, 82' cause the latching mechanism to return to the normally latched position. However, if it is desired to actuate the latching mechanism 66 in the event of a failure of pressure fluid, there is provided a safety latching mechanism 120, 120' formed of rod stock the innermost ends of which are journaled within apertures formed in the vertical web portions of the frame members 29, 28 and the intermediate portions are journaled within apertures formed within the beam members 27, 26. The outer end of the member 120 is provided with a downwardly depending finger 121 and at the outermost end, a downwardly depending U-shaped handle portion 124. In the event of power failure, or failure in the pressure fluid conducting lines, the handle 124 may be grasped and pulled manually outwardly away from the frame thereby causing the draw bar 84 which is situated between the downwardly depending finger 122 and the innermost leg of the U-shaped handle 124, to be moved outwardly, causing the associated latching mechanism to move to an unlatched position.

After the material within the trailer 12 is completely discharged, the door closures 36 and 38 are repositioned in their horizontal position. To accomplish this procedure, the fluid motors 90, 90' may be actuated by the operator to withdraw the latching mechanism, the doors swing to the closed positions, and thence the latching mechanism, under the influence of the springs, 82, 82', is urged back into the latched position by allowing pressure fluid to be admitted to the atmosphere. Manifestly, this procedure may also be manually performed by utilizing the safety members 120.

In order to be certain that the latching mechanism remains in a fully latched position during transit of the associated vehicle, pins 126 may be provided to extend through aligned apertures in the beam members 26, 27 and the associated plungers 66. Manifestly, the pins 126 must be removed prior to the actuation of the latching mechanism to open the closure doors 36 and 38.

While specific mention was not made earlier in the description of the structure of the invention, it will be manifest that the apertures formed in the frame member 29 and beam member 27 for the plunger element 66 must be slightly oversized to allow a canting of the plunger mechanism during withdrawal thereof from the locked or latched position. Also, it will be apparent that in operation, the piston rod 94 of the pressure fluid actuated motor is able to flex slightly during its outward operative movement.

In accordance with the provisions of the patent statutes, I have explained the principle and mode of operation of my invention, and have illustrated and described what I now consider to represent its best embodiment. However, it is to be understood that within the spirit and scope of the appended claims, the invention may be practiced otherwise than as specifically illustrated and described.

What is claimed is:

1. A hopper gate mechanism comprising:
   a frame defining a hopper opening;
   a pair of doors to open and close the opening in said frame;
   hinge means pivotally mounting one edge of each of said doors to said frame;
   at least two spaced apart reciprocable latch members having inner latching ends and outer ends, said latch members movable into a first position wherein the inner ends are in latching engagement with respective ones of said doors and into a second position whereby the inner ends are out of latching engagement with said respective ones of said doors;
   a draw bar pivotally interconnecting the outer ends of said latch members; and
   motor means coupled to said draw bar for effecting selected pivotal movement of said draw bar to selectively move said latch members into the second position out of engagement with said respective ones of said doors.

2. The invention defined in claim 1 including spring means urging said latching member into the first position in latching engagement with said doors.

3. The invention defined in claim 2 wherein said motor means includes a piston rod pivotally coupled to said draw bar.

4. The invention defined in claim 3 wherein said motor means includes at least a pair of spaced apart fluid pressure actuated motors.

5. The invention defined in claim 4 wherein said fluid pressure actuated motors are coupled to said frame to thereby enable relative movement between said draw bar and said frame upon actuating of said motors.

6. The invention defined in claim 5 wherein said frame includes apertures for receiving and guiding the inner ends of said latch members.

7. The invention defined in claim 6 wherein said apertures are sufficiently larger in cross-section than the latch members to permit pivotal movement of latch members during reciprocation thereof.

* * * * *